United States Patent [19]

Bowen et al.

[11] Patent Number: 5,404,448

[45] Date of Patent: Apr. 4, 1995

[54] MULTI-PIXEL ACCESS MEMORY SYSTEM

[75] Inventors: Andrew D. Bowen, Austin, Tex.; Timothy J. Ebbers, Essex Junction, Vt.; Randall L. Henderson, Cary, N.C.

[73] Assignee: International Business Machines Corporation, Armonk, N.Y.

[21] Appl. No.: 264,420

[22] Filed: Jun. 23, 1994

Related U.S. Application Data

[63] Continuation of Ser. No. 929,195, Aug. 12, 1992, abandoned.

[51] Int. Cl.[6] .............................................. G06F 15/62
[52] U.S. Cl. ................................................ 395/164
[58] Field of Search ............... 395/162, 164, 166, 400, 395/425

[56] References Cited

U.S. PATENT DOCUMENTS

| | | | |
|---|---|---|---|
| 4,775,810 | 7/1988 | Knierim | 340/726 |
| 4,823,281 | 4/1989 | Evangelisti et al. | 395/164 |
| 4,845,640 | 7/1989 | Ballard et al. | 364/518 |
| 4,860,248 | 8/1989 | Lumelsky | 364/900 |
| 4,876,663 | 10/1989 | McCord | 364/900 |
| 4,918,436 | 4/1990 | Johary | 340/799 |
| 4,924,415 | 5/1990 | Winser | 364/522 |
| 4,943,937 | 7/1990 | Kasano et al. | 364/521 |
| 4,953,101 | 8/1990 | Kelleher et al. | 364/518 |
| 4,954,951 | 9/1990 | Hyatt | 364/200 |
| 4,961,153 | 10/1990 | Frederickson et al. | 364/521 |
| 4,965,751 | 10/1990 | Thayer et al. | 364/521 |
| 4,980,765 | 12/1990 | Kudo et al. | 358/160 |
| 4,985,848 | 1/1991 | Pfeiffer et al. | 395/164 |
| 4,994,912 | 2/1991 | Lumelsky et al. | 358/140 |
| 5,010,325 | 4/1991 | Ziuchkovski | 340/781 |

Primary Examiner—Mark R. Powell
Assistant Examiner—U. Chauhan
Attorney, Agent, or Firm—Heslin & Rothenberg

[57] ABSTRACT

A random access memory system organized such that multiple pixels may be accessed when one row column address is provided. The random access memory system includes a first group of random access memory devices and a second group of random access memory devices. The first group of devices stores information for pixels on an even horizontal scan line and the second group of devices stores information for pixels on an odd horizontal scan line. An address generator of the random access memory system generates an address to access information from the first group of devices for one pixel and information from the second group of devices for another pixel.

14 Claims, 6 Drawing Sheets

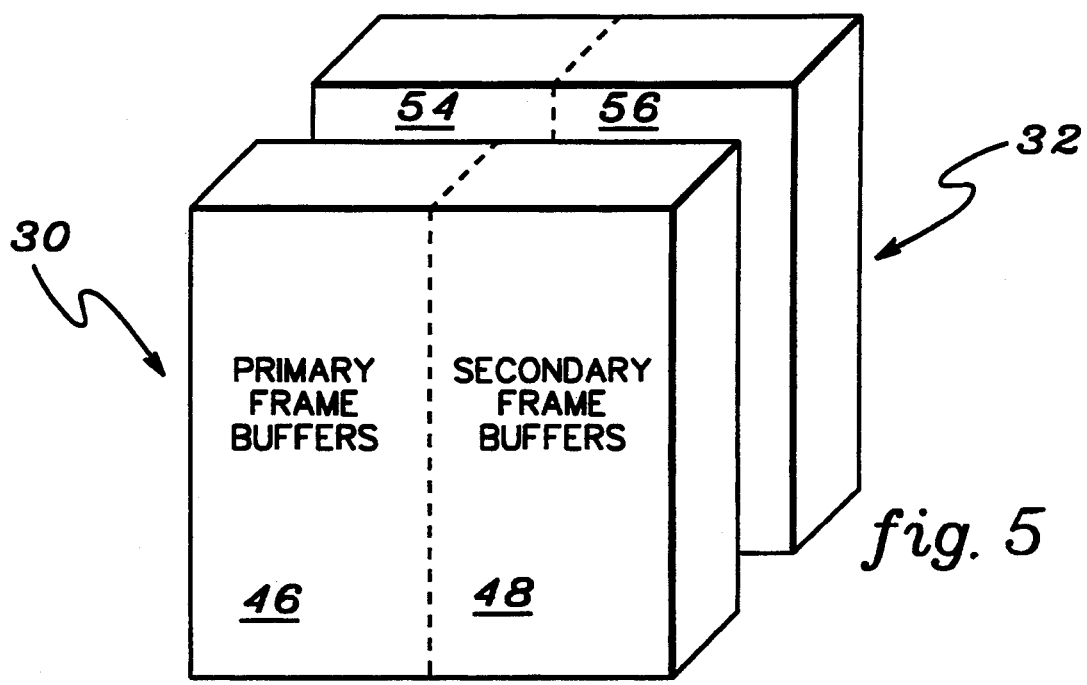
fig. 5
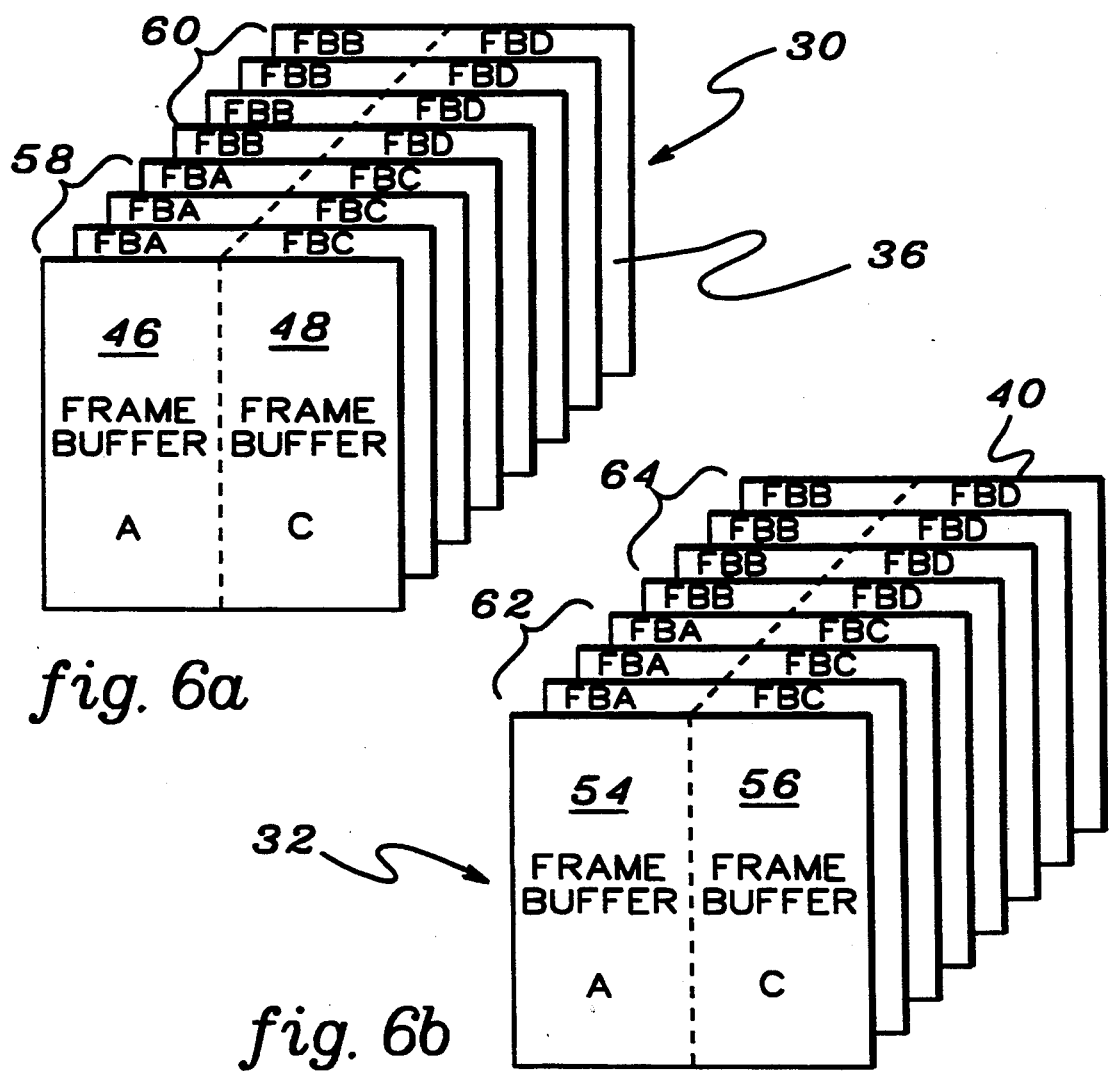
fig. 6a
fig. 6b

MULTI-PIXEL ACCESS MEMORY SYSTEM

This application is a continuation of application Ser. No. 07/929,195, filed Aug. 12, 1992, now abandoned.

TECHNICAL FIELD

This invention relates in general to graphics processing, and more particularly, to an organization of a random access memory system that provides the capability of using one address to render multiple pixels.

BACKGROUND ART

In graphics systems, the rapid access of memory is of paramount importance, since the rate in which memory can be accessed has an impact on the rendering performance of picture elements (pixels) on a display device. Thus, memory organizations which enable the writing of data to and the reading of data from memory in an efficient manner are continually being sought.

Previously, memory has been organized, arranged and addressed in many ways in order to increase performance. For example, a double frame buffer memory has been used to increase the speed at which pixels can be rendered. In a double buffered system, two frame buffers are used so that one buffer can be updated while the other buffer can be scanned out to the screen.

In another example, in United States Patent entitled, "Frame Buffer Memory," issued on Jul. 5, 1988 and having U.S. Pat. No. 4,755,810, a memory organization is described in which a random access memory is organized into tiles. Each tile comprises an array of pixel data word rows and columns corresponding to a separate rectangular subset of horizontally and vertically contiguous display pixels. The RAM is addressed by sequentially applying row and column addresses. A first subset of the column address determines which pixel word row within each tile is addressed, while a second subset of the column address determines which pixel word column within each tile is addressed. The first and second subsets of the column address are selectively incremented and decremented such that words within a selected tile row or column may be successively addressed allowing rapid reading and writing of sequences of pixel data corresponding to contiguous rows or columns of display pixels.

In a further example, United States Patent entitled "High-Speed Dual Mode Graphics Memory" having U.S. Pat. No. 4,845,640 and issued on Jul. 4, 1989, describes a high-speed graphics memory. The memory provides line mode and area mode data transfer at high speeds and comprises a frame buffer structure with unique address alignment and corresponding data manipulation to provide line mode and area mode pixel data transfer of comparable time intervals.

Even though numerous memory organizations have been defined, a need still exists for a memory system that allows even faster access of information and is capable of being accessed efficiently. A further need exists for a memory organization that can easily be expanded. Yet further, a need exists for a memory system that is easily scannable to an output device.

DISCLOSURE OF INVENTION

The shortcomings of the prior art are overcome and additional advantages are provided in accordance with the principles of the present invention through the provision of a random access memory system. The random access memory system includes a first random access memory means having a plurality of rows and columns. Each intersection of a row and a column defines a first memory location having a predefined depth and each of the first memory locations corresponds to one of a first plurality of picture elements. Coupled to the first random access memory means is a second random access memory means having a plurality of rows and columns. Each intersection of a row and column defines a second memory location having a predefined depth and each of the second memory locations corresponds to one of a second plurality of picture elements. One of the first memory locations corresponding to one of the first plurality of picture elements and one of the second memory locations corresponding to one of the second plurality of picture elements are accessed by a generated address.

In one embodiment, the first memory locations are partitioned into a first set of memory locations and an associated second set of memory locations. The first set of memory locations corresponds to the first plurality of picture elements and the second set of memory locations also corresponds to the first plurality of picture elements.

In a further embodiment, the first set of memory locations is representative of a primary frame buffer and the second set of memory locations is representative of a secondary frame buffer. Further, the primary frame buffer is either a frame buffer A or a frame buffer B and the secondary frame buffer is either a frame buffer C or a frame buffer D.

In yet a further embodiment, the depth of the first set of memory locations is divided into a first group of memory locations and a second group of memory locations. The first group of memory locations represents frame buffer A and the second group of memory locations represents frame buffer B. Further, the depth of the second set of memory locations is divided into a first group of memory locations and a second group of memory locations. The first group of memory locations represents frame buffer C and the second group of memory locations represents frame buffer D.

In another embodiment of the invention, the second memory locations are partitioned into a first set of memory locations and an associated second set of memory locations. The first set of memory locations corresponding to the second plurality of picture elements and the associated second set of memory locations also corresponding to the second plurality of picture elements.

In another aspect of the invention, a graphics processing system including a plurality of random access memory systems is provided. Each of the plurality of random access memory systems includes a first random access memory means and a second random access memory means. The first random access memory means and the second random access memory means each have a plurality of rows and columns. The intersection of a row and a column in the first random access memory means defines a first memory location having a predefined depth and each of the first memory locations corresponds to one of a first plurality of picture elements. The intersection of a row and a column in the second random access memory means defines a second memory location having a predefined depth and each of the second memory locations corresponds to one of a second plurality of picture elements. Each random access memory system also includes means for generating an address for use by the respective processor in accessing a first memory location corresponding to one of the first plurality of picture elements and a second memory location corresponding to one of the second plurality of picture elements.

In a further embodiment of the invention, a random access memory system is provided. The random access memory system includes N random access memory means each coupled to one another and each having a plurality of rows and columns. Each intersection of a row and a column defines a memory location having a predefined depth and each of the memory locations corresponding to one of a plurality of picture elements. The system includes means for generating a common address for use by a processor in accessing a memory location from each of the N random access memory means.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

FIG. 5 shows one example of a further definition of the lengthwise partitioning of FIGS. 4a, 4b, in accordance with the principles of the present invention;

FIGS. 6a, 6b depict one example of a depthwise partitioning of each of the random access memory modules illustrated in FIG. 2, in accordance with the principles of the present invention;

BEST MODE FOR CARRYING OUT THE INVENTION

Figure 1:
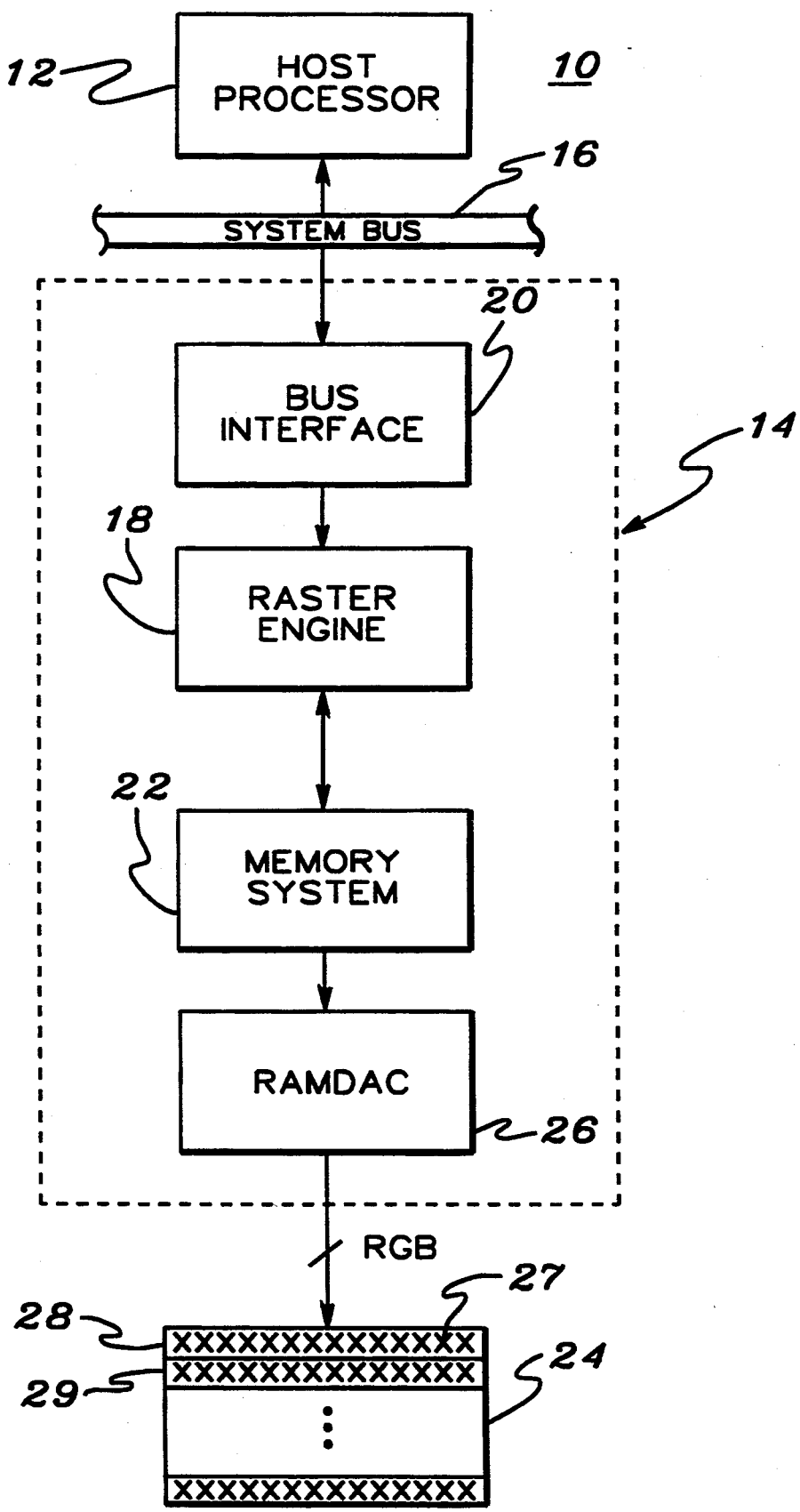
FIG. 1 depicts a block diagram of one embodiment of a computer graphics system incorporating the memory system of the present invention.

Referring to FIG. 1, a system 10 incorporating the present invention includes a host processor 12 and a graphics adapter or subsystem 14 coupled to host processor 12 via a system bus 16. Host processor 12 may be a RISC-based processor, such as that of an International Business Machine's RISC System/6000 workstation, while bus 16 may be a bus, such as the Micro Channel bus having a 32-bit data path. (RISC System/6000 and Micro Channel are trademarks of International Business Machine Corporation.)

In the particular example shown, graphics subsystem 14 includes a graphics processor or raster engine 18 coupled to system bus 16 via a bus interface 20. Graphics processor 18 is in turn coupled to a memory system 22, which is described in further detail below.

The output of memory system 22, which consists of, for instance, color information (i.e., red, green and blue color components) and graphics functions (e.g., overlay and alpha) is supplied to the color (RGB) inputs of an output display device 24. For example, the inputs are passed to a RAMDAC 26 which drives a cathode ray tube. In a manner that is conventional in the art, RAMDAC 26 consists of a random access memory (RAM) (not separately shown) that is addressed by the color output from system memory 22 and whose output drives a digital-to-analog converter (DAC) for each of the RGB color components. The RAM of RAMDAC 26 functions as a color palette or lookup table for performing desired conversions between the output color from system memory 22 and the color supplied to output display device 24.

Output display device 24 includes a number of physical positions, each of which represents a picture element 27 (pixel) of an image to be displayed. A typical output display device 24 in a graphics workstation, such as in the RISC System/6000 referred to above, may span 1280 pixels horizontally and 1024 pixels vertically. Display monitor 24 includes a number of even horizontal scan lines 28 (e.g., scan lines 0, 2, 4, 6 . . . 1022) and odd horizontal scan lines 31 (e.g., scan lines 1, 3, 5, 7 . . . 1023) and each scan line includes a number of picture elements (or pixels) 27. Although in the system shown in FIG. 1 the display device is a monitor, the present invention may also be used with other display devices, such as printers.

Graphics processor 18 accepts data from host processor 12, which may represent a straight line segment or vector in terms of the coordinates of its endpoints, and "rasterizes" that data by converting it to a form suitable for storage in system memory 22 and ultimately display on monitor 24.

In accordance with the principles of the present invention, memory system 22 is organized such that information associated with, for example, a pixel on even horizontal scan line 28 and odd horizontal scan line 29 may be accessed by one row column address, as described in detail below. This organization enables the number of pixels accessed in an overall graphics processing system comprising a number of graphics processors and associated memory systems to be doubled. One embodiment of the organization of memory system 22 is described in detail with reference to FIGS. 2–4b.

Figures 2, 3A, 3B:
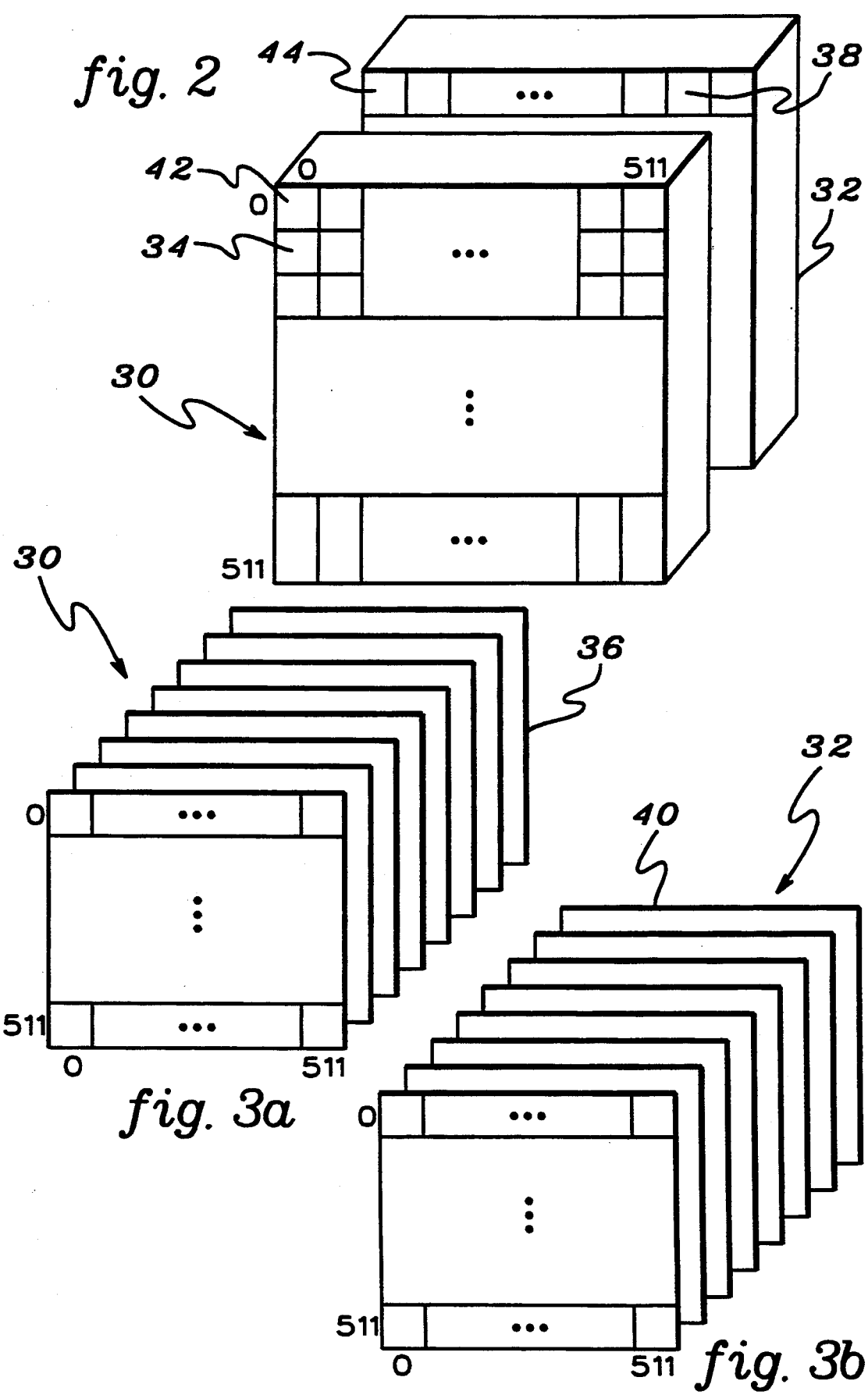
FIG. 2 depicts one embodiment of two random access memory modules of the memory system of FIG. 1, in accordance with the principles of the present invention.
FIGS. 3a, 3b illustrate one embodiment for each of the random access memory modules of FIG. 2, in accordance with the principles of the present invention.

Referring to FIG. 2, in accordance with the principles of the present invention, memory system 22 includes, for instance, a first random access memory module 30 and a second random access memory module 32. Module 32 is coupled to module 30 by common control and address signals, described further below.

First random access memory module 30 has a plurality of rows and columns and a predefined depth. Each row and column intersection defines a memory location 34 having a depth equaling the predefined depth of module 30. The memory locations of module 30 correspond to some of pixels 27 of output display monitor 24, as described further below. In one embodiment, random access memory module 30 includes, for instance, a plurality of video random access memories (VRAMs) 36 (FIG. 3a), such as the eight 2 Mbit (megabit) video random access memories illustrated in FIG. 3a. Each video random access memory has, for instance, 512 rows, 512 columns and a depth of 8 bits. Thus, the depth of each memory location of module 30 is 64 bits (8 VRAMs each 8 bits deep). Those 64 bits are used to represent one pixel. (It will be apparent to those of ordinary skill in the art that module 30 may include any number of random access memories. Further, the random access memories can be of a different density than described herein and can include other memories beside the video random access memories.)

Similar to random access memory module 30, module 32 (FIG. 2) also has a plurality of rows and columns and a predefined depth. Each row and column intersection defines a memory location 38 having a depth equaling the predefined depth of module 32. Memory locations 38 also store information for a number of pixels. However, the pixels represented by memory locations 38 are different than those pixels represented by memory locations 34. In one example, as shown in FIG. 3b, random access memory module 32 also includes a plurality of 2Mbit video random access memories 40, each having 512 rows and 512 columns and a depth of 8 bits.

In accordance with the principles of the present invention, the pixels represented by memory locations 34 of first random access memory module 30 are those pixels located on even horizontal scan lines 28 and the pixels represented by memory locations 38 of second random access memory module 32 are those pixels located on odd horizontal scan lines 29. For example, the first pixel on a first even horizontal scan line referred to as Pixel 0,0 in a cartesian coordinate system is represented by module 30 (reference numeral 42 of FIG. 2) and the first pixel on the first odd horizontal scan line referred to as Pixel 0,1 is represented by module 32 (reference numeral 44). (In accordance with the principles of the present invention, since module 32 is coupled to module 30, the row column address (row 0, column 0) accesses information for two pixels (e.g., pixel 0,0 and pixel 0,1)). The mapping of rows and columns in the modules to pixels is arbitrary. That is, row 0, column 0 in the module does not have to correspond to pixel 0,0. In addition, it will be apparent to one of ordinary skill in the art, that the pixels represented by memory locations 34 or memory locations 38, do not need to be on an even or odd horizontal scan line, respectively. For example, the pixels represented by memory locations 34 can be a group of pixels from multiple scan lines or, for instance, every nth scan line (nth refers to any number of scan lines), or as another example, can represent a portion from every scan line. The above is also true for memory locations 38.

In systems, such as system 10, double buffering is frequently used in order to improve image quality. As one example, double buffered systems use two frame buffers, a frame buffer A and a frame buffer B, for storing information relating to pixels. This information generally includes color components (e.g., red, green and blue) and graphics functions (e.g., alpha and overlay). By using two buffers, information stored in one frame buffer can be scanned out to the output display device while the other frame buffer is being updated by raster engine 18 (FIG. 1). Double buffering is supported by the random access memory organization of the present invention and is described in detail with reference to FIGS. 4a–6b. Further, in addition to the double buffers, frame buffer A and frame buffer B, two other buffers (e.g., frame buffer C and frame buffer D) are used to store further information about the pixels represented by frame buffers A and B, as described further below.

Figure 4A:
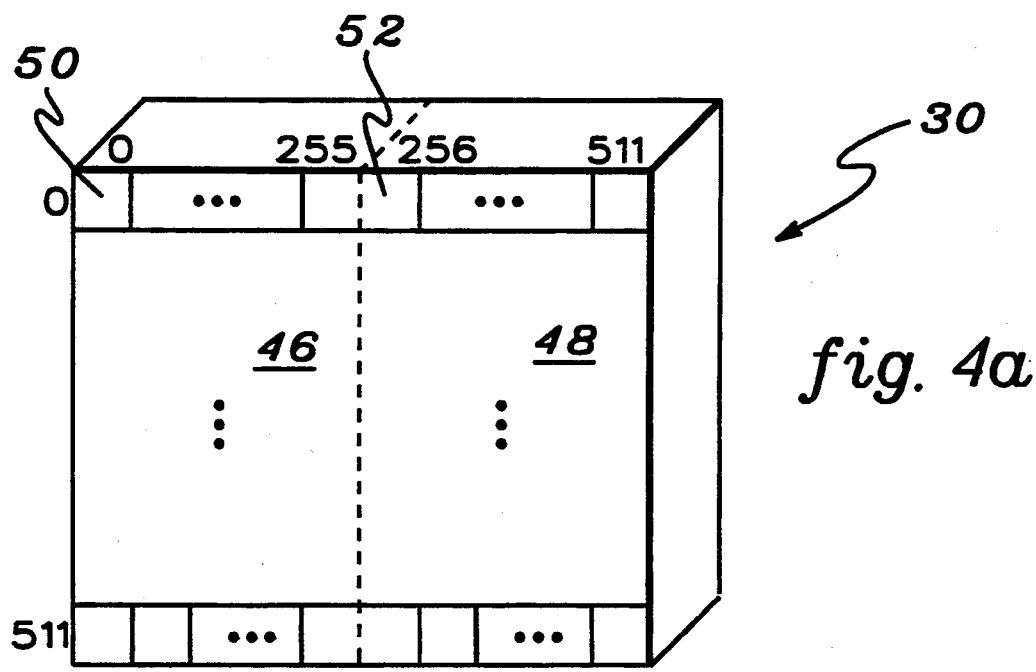
FIGS. 4a, 4b illustrate a lengthwise partitioning of the random access memory modules of FIG. 2, in accordance with the principles of the present invention.

As illustrated in FIG. 4a, video random access memory module 30 is partitioned lengthwise into two sets of memory locations. A first set 46 includes those memory locations defined by the intersections of rows 0–511 and columns 0–255. In accordance with the principles of the present invention, these memory locations represent a number of the pixels on even horizontal scan line 28. In addition to first set 46, a second set 48 is provided which includes memory locations defined by the intersections of rows 0–511 and columns 256–511. These memory locations represent the same pixels as those represented in first set 46. In particular, in one embodiment, there is a one to one correspondence between a memory location in the first set and a memory location in the second set. For instance, if memory location 50 represents a Pixel 0,0, then memory location 52 also represents Pixel 0,0. By partitioning first random access memory module 30 in the above-described manner, information for a pixel to be scanned out rapidly may be placed in a memory location located in first set 46 and other information corresponding to the same pixel that typically, does not need to be scanned out simultaneously with the information in the first set is placed in second set 48.

Figure 4B:
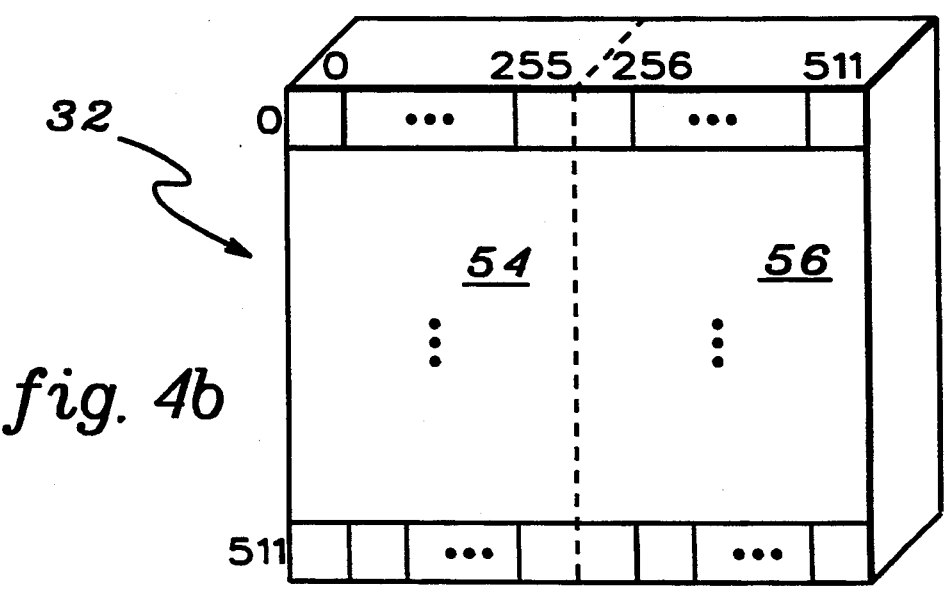

Similar to first random access memory module 30, second memory module 32 is also partitioned lengthwise into two sets of memory locations. As illustrated in FIG. 4b, a first set of memory locations 54 includes those memory locations defined by the intersections of rows 0–511 and columns 0–255 and a second set of memory locations 56 includes those memory locations defined by the intersections of rows 0–511 and columns 256–511. In accordance with the principles of the present invention, the memory locations located in set 54 represent a number of the pixels on odd horizontal scan line 29 and the memory locations located in set 56 represent the same pixels. Once again, in one embodiment, there is a one to one correspondence between a memory location in set 54 and a memory location in set 56. By partitioning second random access memory module 32 in the above-described manner, information for a particular pixel to be scanned out rapidly may be placed in a memory location located in first set 54 and additional information for those pixels can be placed in second set 56.

In one embodiment, as illustrated in FIG. 5, the memory locations located in set 46 and set 54 are representative of primary frame buffers, since this information is to be scanned out rapidly, and the memory locations located within sets 48 and 56 are representative of secondary frame buffers, which contain additional information for the same pixels. As shown in FIGS. 6a and 6b, primary frame buffers include, for instance, frame buffer A and frame buffer B and secondary frame buffers include, for instance, frame buffer C and frame buffer D. The arrangement of the primary and secondary frame buffers are described in detail with reference to FIGS. 6a–6b.

As described previously, random access memory module 30 comprises a plurality of random access memories 36. In one embodiment, the plurality of random access memories is divided depthwise into a first group of video random access memories 58 and a second group of video random access memories 60. First group 58 includes those memory locations in frame buffer A and frame buffer C and second group 60 contains the memory locations in frame buffer B and frame buffer D. In this one embodiment, frame buffer A is paired with frame buffer C and frame buffer B is paired with frame buffer D. By arranging the frame buffers in this manner, the primary buffers (i.e., frame buffer A and frame buffer B) for a given pixel may be accessed by one row column address. For example, if row column address 0,0 representing Pixel 0,0 is provided, the information contained within frame buffer A and frame buffer B may be accessed for Pixel 0,0.

Likewise, as described previously, random access memory module 32 comprises a plurality of random access memories 40. In one embodiment, the plurality of random access memories is divided depthwise into a first group of video random access memories 62 and a second group of video random access memories 64. First group 62 includes those memory locations in frame buffer A and frame buffer C and second group 64 contains the memory locations in frame buffer B and frame buffer D. In this one embodiment, frame buffer A is paired with frame buffer C and frame buffer B is paired with frame buffer D. By arranging the frame buffers in this manner, the primary buffers (i.e., frame buffer A and frame buffer B) for a given pixel may be accessed by one row column address. For example, if row column address 0,0 representing Pixel 0,1 (since this is module 32, row column address 0,0 represents Pixel 0,1 in the above examples, and not Pixel 0,0) is provided, the information contained within frame buffer A and frame buffer B may be accessed for Pixel 0,1.

Described above is a random access memory system which allows information corresponding to multiple pixels, and in the particular example, two pixels to be accessed by one row column address. The following is a detailed description of how data is written to or read from a memory location in module 30 or module 32.

Figure 7:
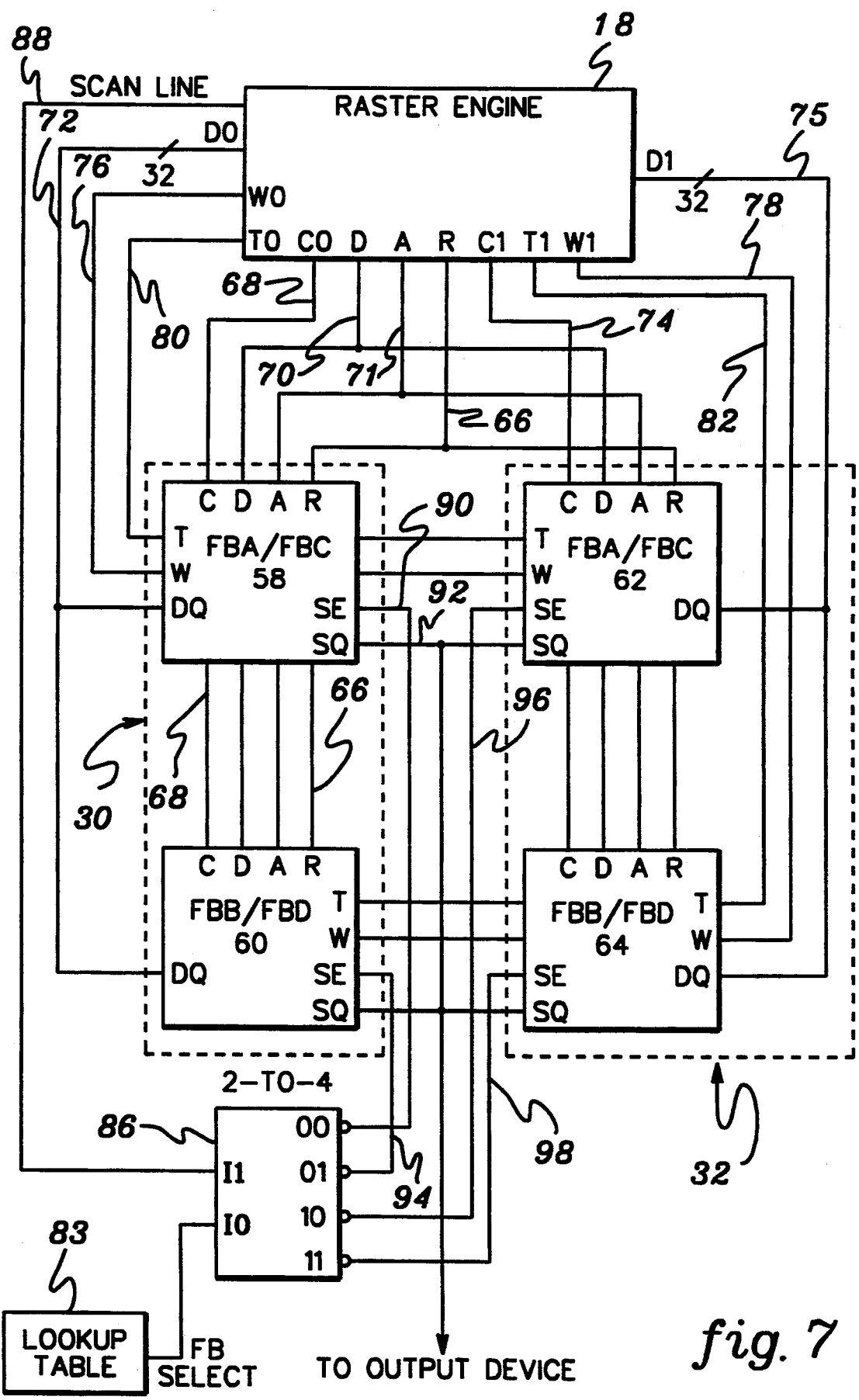
FIG. 7 illustrates one embodiment of the signals used for writing information to and reading information from the memory system, in accordance with the principles of the present invention.

As previously described, module 30 is divided depthwise into first group of random access memories 58 and second group of random access memories 60 and module 32 is divided into first group of random access memories 62 and second group of random access memories 64. As illustrated in FIG. 7, module 30 is coupled to module 32 via common control and address signals. Group 58 and group 60 of module 30 each receive a common row address strobe (RAS) signal (R) 66, column address strobe (CAS) signal (C0) 68, designated for special function (DSF) signal (D) 70, an address line 71 and a data bus (D0) 72. Likewise, group 62 and group 64 each receive a number of common signals. RAS signal 66, DSF signal 70, and address line 71 which are input to groups 58 and 60 are also input to groups 62 and 64. In addition, group 62 and group 64 each receive a CAS signal (C1) 74 and a data bus (D1) 75.

In order to write to a particular memory location in module 30 or module 32, a row column address generated by raster engine 18 is used. The row column address is based on the X,Y coordinate of the pixel it wants to draw. The row address portion of the row column address is input to module 30 (i.e., group 58 and group 60) and module 32 (i.e., group 62 and 64) via address line 71. Subsequently, RAS signal 66 goes low in order to latch the row address on line 71 to each of the groups. Thereafter, the address on line 71 changes to the column address and either CAS signal 68 or CAS signal 74 goes low, as described herein.

In the illustrative example used herein, module 30 corresponds to pixels on an even scan line and module 32 corresponds to pixels on an odd scan line, thus it is possible to use the least significant bit of the Y coordinate to enable one or both of CAS signal 68 and CAS signal 74. In one example, if the least significant bit is zero, then CAS signal 68 is enabled and on the other hand, if the least significant bit is one, then CAS signal 74 is enabled. It is also possible to enable both CAS signals. If, for instance, the Y coordinate is such that two neighboring pixels that differ in only the least significant bit in Y are desired, then both can be accessed simultaneously by dropping CAS signals 68 and 74. (In another embodiment, another bit of the coordinate may be used to differentiate between the pixels represented in module 30 and module 32.)

When one or both of the CAS signals falls, then data can be written to the particular memory location. In one embodiment, if data is to be written to a frame buffer A/frame buffer C pair (i.e., either group 58 or 62), then a write enable (W0) signal 76 is enabled. Therefore, the data is written to either group 58 or group 62 depending on whether CAS signal 68 or CAS signal 74 is enabled (note that C0, C1, W0, R are all active low signals). For example, if CAS signal 68 and write enable signal 76 are enabled, then the data on bus 72 is written to a memory location designated by the row column address in group 58.

In another embodiment, if data is to be written to a frame buffer B/frame buffer D pair (i.e., either group 60 or group 64), then a write enable (W1) signal 78 is enabled (W1 is also an active low signal). Therefore, the data is written to either group 60 or group 64 depending on whether CAS signal 68 or CAS signal 74 is enabled. If for example, CAS signal 74 and write enable signal 78 are enabled, then the data on bus 75 is written to a memory location designated by the row column address in group 64.

Further, it is possible to write to a memory location in both module 30 and module 32 since each module has a separate data bus (D0 and D1, respectively). In order to write to both modules, CAS signal 68 and CAS signal 74 are dropped to low signals.

It will be apparent to one of ordinary skill in the art that additional modules may be coupled together and accessed in a manner similar to that described above such that multiple memory locations representing multiple pixels may be accessed by one common row column address.

In order to access a memory location to perform a read operation (i.e., read data from memory system to raster engine), the above technique is used, however, each of the write enable signals 76, 78, respectively are kept high and an appropriate trigger signal (T0) 80 or (T1) 82 is dropped. As shown in FIG. 7, trigger signal 80 is input to each frame buffer A/frame buffer C pair and trigger signal 82 is input to each frame buffer B/frame buffer D pair.

Previously described is a technique for writing data to the memory system from the raster engine and for reading data from the memory system to the raster engine. However, information is also serially written from memory system 22 to output display device 24 via a RAMDAC 26 (FIG. 1). In order to accomplish this, a signal referred to as FB Select is output from a conventional look-up table 83, which indicates whether frame buffer A or frame buffer B is to be scanned out (frame buffer C and frame buffer D are secondary buffers and are not simultaneously scanned out with the primary buffers). If, for example, FB Select is equal to a zero, then frame buffer A is selected and if FB Select is equal to a one, then frame buffer B is selected. The FB Select signal is input (I0) to a conventional two-to-four decoder 86 along with a scan line signal 88 (input I1), which indicates, in this example, whether a pixel being rendered is on an even or an odd scan line. If, for instance, I1 is equal to a zero, then it is an even scan line and if I1 is equal to a one, then it is an odd scan line. The outputs of decoder 86 indicate whether frame buffer A on an even or odd scan line or frame buffer B on an even or odd scan line is being accessed. If, for example, output 00 is enabled, then serial enable 90 is activated which activates serial data 92 and therefore, data corresponding to frame buffer A even scan line is output to output display device 24. In another example, output 01 is activated and serial enable 94 is activated causing data for frame buffer B even scan line to be output. In addition, when output 10 is enabled, serial enable 96 is activated and data for frame buffer A odd scan line is output. Similarly, if output 11 is enabled, serial enable 98 is activated and data for frame buffer B odd scan line is output.

As described above, the random access memory system of the present invention enables the access of information stored in frame buffers for multiple pixels at a time. This invention advantageously facilitates the expansion of a memory system for a graphics processing system. In particular, a memory system that only includes frame buffer A and frame buffer B, can be easily adapted to include frame buffer C and frame buffer D. This enhances system performance.

Figure 8:
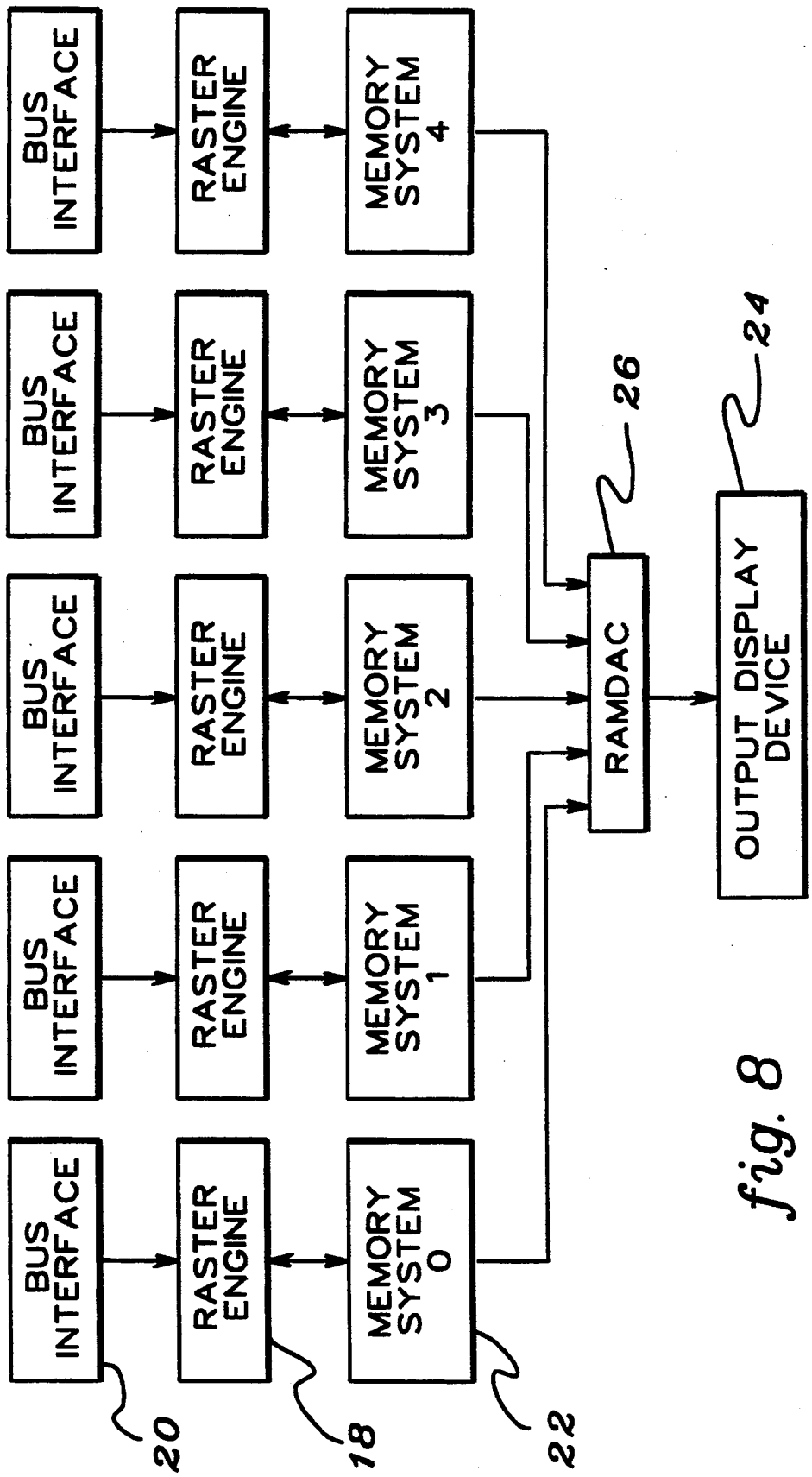
FIG. 8 depicts a graphics processing system comprising a plurality of memory systems, in accordance with the principles of the present invention.

In addition to the above, in one embodiment, more than one graphics processor may be used to render data to output device 24. In such a graphics processing system, each memory system 22 stores information for a number of the pixels on output display device 24, as described below. In one embodiment, as shown in FIG. 8, a graphics processing system 84 includes, for example, five bus interfaces 20, five raster engines 18 and five memory systems 22. Each of the above components is similar to those described above. The outputs of each memory system 22 are input to output display device 24 via, for instance, RAMDAC 26.

In graphics processing system 84, ten memory locations can be accessed during one clock cycle (two memory locations for each system memory) and therefore, the rate in which pixels can be rendered on output display device 24 is increased. In one embodiment, each system memory stores data for a predetermined set of pixels. For instance, since there are five memory systems, each system contains information for every fifth pixel of an output display device. In particular, the memory locations in a first row of module 30 of memory system 0 of FIG. 8 represent pixels 0,0; 5,0; 10,0; 15,0; . . . 1275,0 (in this example, module 30 has 256 columns and represents the pixels on the even scan lines) and the memory locations in a first row of module 32 represents pixels 0,1; 5,1; 10,1; . . . 1275,1 (module 32 also has 256 columns and represents the pixels on the odd scan lines). Following with the above example, the memory locations in a first row of module 30 of memory system 1 of FIG. 8 represent pixels 1,0; 6,0; . . . 1276,0 and the memory locations in a first row of module 32 represents pixels 1,1; 6,1; . . . 1276,1. The remaining memory systems depicted in FIG. 8 represent pixels in the manner described above.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A random access memory system, comprising:
a first random access memory means having a plurality of rows and columns, each intersection of a row and a column defining a first memory location such that first memory locations are defined each first memory location having a predefined depth, and each memory location corresponding to a picture element on an even horizontal scan line;
a second random access memory means coupled to said first random access memory means, said second random access memory means having a plurality of rows and columns, each intersection of a row and a column defining a second memory location such that second memory locations are defined each second memory location having a predefined depth, and each first memory location corresponding to a picture element on an odd horizontal scan line;
means for partitioning said first memory locations into a first set of memory locations and an associated second set of memory locations and said second memory locations into a first set of memory locations and an associated second set of memory locations, wherein the first sets of memory locations define a first unit of memory locations and the second sets of memory locations define a second unit of memory locations, wherein said first unit of memory locations corresponds to a first plurality of picture elements and said second unit of memory locations corresponds to said first plurality of picture elements; and
means for generating an address for accessing one of said first unit of memory locations and said second unit of memory locations such that an accessed unit of memory locations is provided and wherein said address selects from said accessed unit of memory locations a first and second memory location.

2. The system of claim 1, wherein said first random access memory means comprises a first plurality of random access memory devices and said second random access memory means comprises a second plurality of random access memory devices.

3. The system of claim 1, wherein a one to one correspondence exists between each memory location in said first set of memory locations of said first memory locations and each memory location in said associated second set of memory locations of said first memory locations.

4. The system of claim 1, wherein said first set of memory locations of said first memory locations is representative of a primary buffer and said second set of memory locations of said first memory locations is representative of a secondary buffer.

5. The system of claim 4, wherein said primary buffer includes one of a frame buffer A and a frame buffer B, and said secondary buffer includes one of a frame buffer C and a frame buffer D.

6. The system of claim 5, wherein the predefined depth of said first set of memory locations of said first memory locations is divided into a first group of memory locations and a second group of memory locations, said first group of memory locations representing frame buffer A and said second group of memory locations representing frame buffer B.

7. The system of claim 5, wherein the predefined depth of said second set of memory locations of said first memory locations is divided into a first group of memory locations and a second group of memory locations, said first group of memory locations representing frame buffer C and said second group of memory locations representing frame buffer D.

8. The system of claim 1, wherein a one to one correspondence exists between each memory location in said first set of memory locations of said second memory locations and each memory location in said associated second set of memory locations of said second memory locations.

9. The system of claim 1, wherein said first set of memory locations of said second memory locations is representative of a primary buffer and said second set of memory locations of said second memory locations is representative of a secondary buffer.

10. The system of claim 9, wherein said primary buffer includes one of a frame buffer A and a frame buffer B, and said secondary buffer includes one of a frame buffer C and a frame buffer D.

11. The system of claim 10, wherein the predefined depth of said first set of memory locations of said second memory locations is divided into a first group of memory locations and a second group of memory locations, said first group of memory locations representing frame buffer A and said second group of memory locations representing frame buffer B.

12. The system of claim 10, wherein the predefined depth of said second set of memory locations of said second memory locations is divided into a first group of memory locations and a second group of memory locations, said first group of memory locations representing frame buffer C and said second group of memory locations representing frame buffer D.

13. A graphics processing system, comprising:

a plurality of random access memory systems storing information for a predefined number of picture elements, each of said plurality of random access memory systems comprising:

a first random access memory means having a plurality of rows and columns, each intersection of a row and a column defining a first memory location such that first memory locations are defined, each first memory location corresponding to a picture element on an even horizontal scan line;

a second random access memory means coupled to said first random access memory means, said second random access memory means having a plurality of rows and columns, each intersection of a row and a column defining a second memory location such that second memory locations are defined;

means for partitioning said first memory locations into a first set of memory locations and an associated second set of memory locations and said second memory locations into a first set of memory locations and an associated second set of memory locations, wherein the first sets of memory locations define a first unit of memory locations and the second sets of memory locations define a second unit of memory locations, wherein said first unit of memory locations corresponds to a first plurality of picture elements and said second unit of memory locations corresponds to said first plurality of picture elements; and means for generating an address for use in accessing one of said first unit of memory locations and said second unit of memory locations such that an accessed unit of memory locations is provided and wherein said address selects from said accessed unit of memory locations a first and second memory location.

14. The system of claim 1, wherein said partitioning is a lengthwise partitioning.

* * * * *

UNITED STATES PATENT AND TRADEMARK OFFICE
CERTIFICATE OF CORRECTION

PATENT NO.   : 5,404,448
DATED        : April 04, 1995
INVENTOR(S)  : Bowen et al.

It is certified that error appears in the above-indentified patent and that said Letters Patent is hereby corrected as shown below:

Column 10, line 10, delete "each memory" and substitute therefor --each first memory--.

Column 10, line 19, delete "each first memory" and substitute therefor --each second memory--.

Signed and Sealed this

Thirty-first Day of October 1995

Attest:

BRUCE LEHMAN

*Attesting Officer*     *Commissioner of Patents and Trademarks*